US009633498B2

(12) United States Patent
Wiewiora

(10) Patent No.: US 9,633,498 B2
(45) Date of Patent: Apr. 25, 2017

(54) SYSTEMS AND METHODS FOR AN AUTOMATED ENTRY SYSTEM

(71) Applicant: Jan Michael Wiewiora, Reston, VA (US)

(72) Inventor: Jan Michael Wiewiora, Reston, VA (US)

(73) Assignee: Unisys Corporation, Blue Bell, PA (US)

( * ) Notice: Subject to any disclaimer, the term of this patent is extended or adjusted under 35 U.S.C. 154(b) by 177 days.

(21) Appl. No.: 14/220,174

(22) Filed: Mar. 20, 2014

(65) Prior Publication Data

US 2014/0285315 A1 Sep. 25, 2014

Related U.S. Application Data

(60) Provisional application No. 61/803,815, filed on Mar. 21, 2013.

(51) Int. Cl.
*G05B 19/00* (2006.01)
*G07C 9/00* (2006.01)

(52) U.S. Cl.
CPC ..... *G07C 9/00158* (2013.01); *G07C 9/00166* (2013.01)

(58) Field of Classification Search
CPC ............ G07C 9/00126; G07C 9/00158; G07C 9/00166; G06F 21/32; G06K 2209/15; G06K 9/00597; G06K 9/00604; G06K 9/0061; G06K 9/00617; G06K 9/00281; G06K 9/325
See application file for complete search history.

(56) References Cited

U.S. PATENT DOCUMENTS 4,958,064 A * 9/1990 Kirkpatrick .......... G06K 7/1092 235/384
7,369,685 B2 * 5/2008 DeLean .................. G06F 21/32 382/115
8,005,267 B2 * 8/2011 Chew ................. G06K 9/00885 340/540
8,558,887 B2 * 10/2013 Plaster ............... G07C 9/00087 348/143
8,582,819 B2 * 11/2013 Rodriguez Serrano ................ G06K 9/6255 382/105
8,704,889 B2 * 4/2014 Hofman ................. G06K 9/209 348/143
8,710,955 B2 * 4/2014 Teti .................... G07C 9/00158 187/313
8,731,736 B2 * 5/2014 Chang ................... B60W 50/14 340/576

(Continued)

*Primary Examiner* — Ryan Sherwin
(74) *Attorney, Agent, or Firm* — Robert P. Marley; Richard J. Gregson

(57) ABSTRACT

Disclosed herein are systems and methods for determining whether individuals seeking access to a facility site are authorized to enter. The system identifies a license plate of a vehicle approaching a controlled entrance of the facility site. If the vehicle is found in a database of enrolled entrants, then an enrolled entrant is loaded into a quick access memory. Iris scans of passengers the passengers are taken and compared against records of the enrolled entrants, beginning with the expected passengers identified as being associated with the license of the vehicle approaching the facility site.

16 Claims, 2 Drawing Sheets

(56) References Cited

U.S. PATENT DOCUMENTS

| | | | | |
|---|---|---|---|---|
| 2004/0078335 | A1* | 4/2004 | Calvesio ................ | G06Q 10/02 705/50 |
| 2004/0201460 | A1* | 10/2004 | Bucholz ................ | B60R 25/305 340/426.1 |
| 2013/0141578 | A1* | 6/2013 | Chundrlik, Jr. ........ | H04N 7/181 348/148 |

* cited by examiner

SYSTEMS AND METHODS FOR AN AUTOMATED ENTRY SYSTEM

CROSS-REFERENCE TO RELATED APPLICATIONS

This non-provisional patent application claims the benefit of U.S. Provisional Patent Application Ser. No. 61/803,815, filed Mar. 21, 2013, the entire contents of which are hereby incorporated herein by reference.

FIELD OF THE DISCLOSURE

The subject matter disclosed herein generally relates to managing controlled access to facility sites and providing for automated entry.

BACKGROUND

Facilities can have number of entry points that need to be secured from unwanted visitors or trespassers. Conventional means for securing access to facilities typically require one or more something a person possesses (e.g., a badge), some feature describing the person (e.g., a fingerprint), and/or something the person knows (e.g., a password). Some entry points of facilities may be locations in which entrants pass through by vehicle. In some cases, traffic can be accrue when entrants' access assessments are conducted inefficiently. And in some cases, conventional means of determining access may be too slow for entry points to facilities having such vehicle lanes.

In conventional vehicle entry points, a driver approaching a facility arrives at a gate and comes to a stop. A guard must read an identification badge associated with the driver to determine whether the driver may be granted access. In some conventional entry points, a driver may stop their vehicle at the gate, bring down a window, and present a badge to a badge-reading device or panel. This type of badge-reading device electronically sends data associated with the badge to a server that will determine whether access should be granted to the driver.

When a badge-reader is used, the badge could be valid but, in some cases, it is difficult to determine if the driver is the appropriate card holder. When a guard assesses the badge, the driver may be identified but, in some cases, it could be difficult to determine whether the badge is valid. Conventional methods exercising some combination of both badge-readers and guards can be expensive and/or inefficient.

Some conventional access control means can implement biometric assessments of drivers. In some cases, may assess the fingerprint of drivers. Fingerprints may be inefficient however. In some cases, scanners can require a relatively long time to extract a print; especially when considering traffic accumulation at a facility entry point. Moreover, in an outside environment, it can be expensive and inefficient to keep the surface of a fingerprint reader clean.

At facility access points relying on guards, a proper assessment may be susceptible to human error, whether intended or innocent. Human guards are vulnerable to social engineering, may take a long time to determine an identity, and may commit any number of natural human errors. Moreover, human guards may only access data immediately provided to them. Conventional control points may provide for a computer for which guards may access information from a central database. However, such conventional systems may be limited in scope. Human guards can not automatically scan through records stored at a plurality of databases using a plurality of identifying metrics (e.g., license plate, biometrics, badge).

What is needed is an efficient but secure means of providing for controlling access to a facility at an entry point designed for vehicles and/or pedestrians. What is needed is a means for controlling access that can assess a driver's identity using more than one data point. What is needed is an automated means for accurately identifying vehicles and passengers that may remove aspects of human error. What is needed is a means for scanning various databases based on multiple observations of entrants and vehicles and making assessments based on existing and prior relationships of those observed characteristics and vehicles of such entrants.

SUMMARY

In one embodiment, a computer-implemented method for controlling access to a facility at an accesses control point, the method comprises receiving, by a computer of an access control system, an image of a license plate associated with a vehicle approaching an access control point from a camera; determining, by the computer, whether the vehicle is associated with an enrolled entrant based upon a match of the license plate with a record in a site database; receiving, by the computer, a scan of an iris of a passenger in the vehicle from an iris scanner, determining, by the computer, whether the passenger is the enrolled entrant associated with the vehicle based upon a match of the scan of the iris to record in a site database; authorizing, by the computer, entry for the vehicle upon determining the passenger is the enrolled entrant associated with the vehicle.

In another embodiment, an access control system for controlling access at a facility site, the system comprises a camera capturing an image of a license plate of a vehicle approaching an access control point (ACP) of the facility and transmitting the image of the license plate to an ACP server associated with the ACP; an iris scanner capturing a scan of a individual in the vehicle approaching the access control point and transmitting the scan to the ACP server, a cache memory storing a record from the ACP server associated with the license plate to be matched to the individual based on the scan; a site database storing records of one or more enrolled entrants authorized to enter a facility and associated with a license plate, wherein each enrolled entrant is uniquely identified by an iris; and the ACP server searching the site database and automatically authorizing entry to the approaching vehicle responsive to matching the scan of the iris of the individual with the unique iris of an enrolled entrant and matching the license of the vehicle with the license plate associated with the enrolled entrant.

It is to be understood that both the foregoing general description and the following detailed description are exemplary and explanatory and are intended to provide further explanation of the invention as claimed

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1:
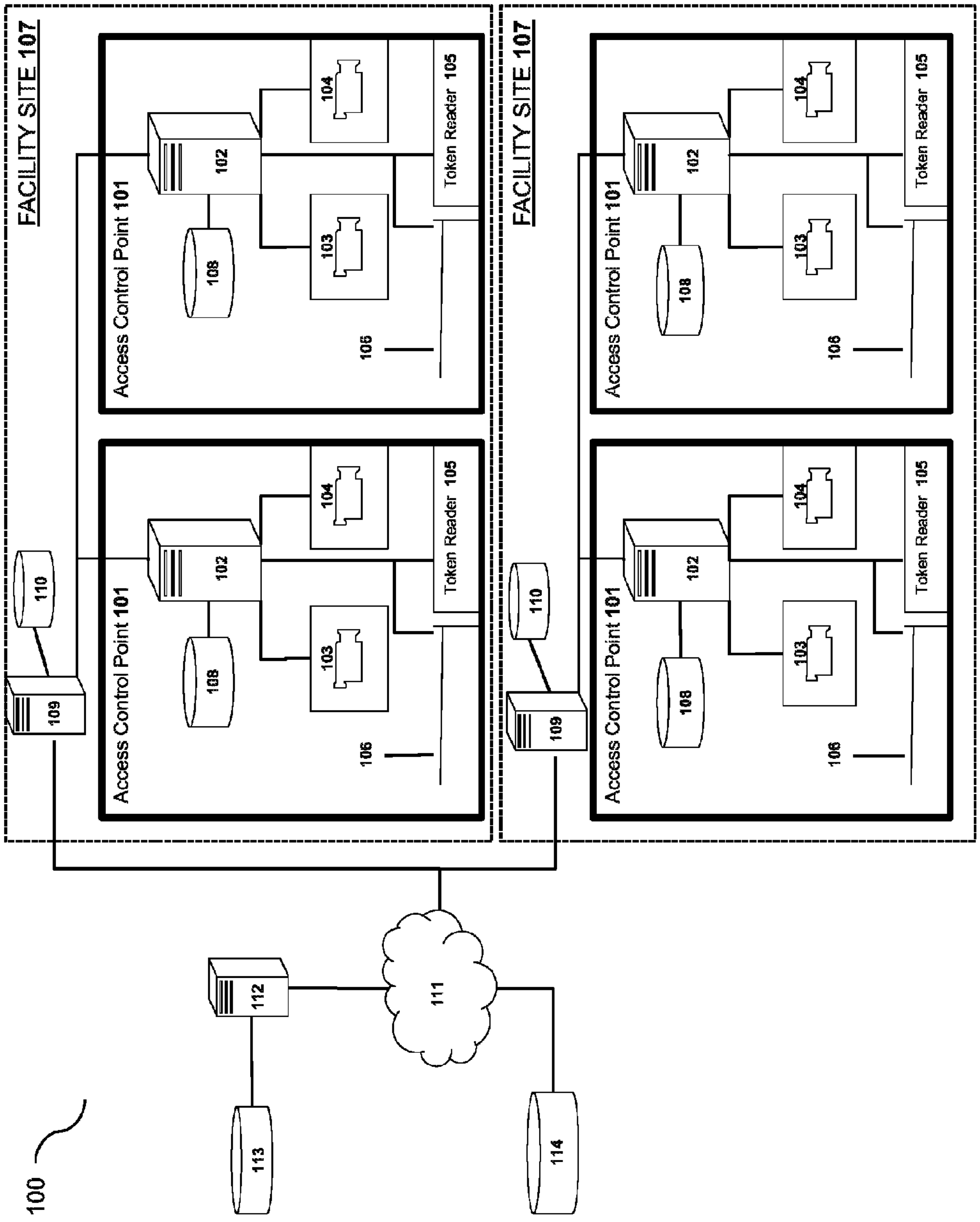
FIG. 1 shows a logical architecture for an access control and automated entry system according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Embodiments of an access control system may determine whether to grant access to individuals seeking access to a facility site. Individuals may be passengers of a vehicle approaching an access control point of a facility site. A system may utilize use biometrics (e.g., fingerprint, voiceprint, iris scan, retinal scan) to determine whether passengers of approaching vehicles are authorized entrants who are in an enrolled entrant database. An iris camera and/or scanner may be situated outside nearby a lane for controlling vehicle access. Iris scanners may use infrared lights to light up the irises passengers' eyeballs to take pictures or scans of irises.

Embodiments of the access control system may further comprise authentication servers executing license plate reader modules. These license plate reader modules may receive license plate images from cameras situated nearby vehicle lanes nearby access control points. Databases of the access control system may store records relating to vehicles that have previously approached access control points at facility sites. License plates may be associated in databases with passengers of the vehicles having the identified license plates.

Embodiments of the access control system may employ biometric readings and license plate reader modules as a means of quickly performing two-factors of authenticating individuals seeking access to facility sites. Other embodiments may employ more or other means of authenticating and identifying individuals. Embodiments of the access control system may employ license plate reader modules to identify approaching vehicles, and in some cases search national and/or local watch list entries for vehicles and/or people that are not granted access to facility sites. That is, some embodiments may read a license plate, perform a quick search of a watch list and then raise alarms or otherwise deny access based upon a vehicles and/or individuals required to be denied access.

Servers and databases may logically reside in a hierarchical architecture. Lowest level servers and databases may be dedicated to one or more access control points. Servers dedicated to access control points may execute one or more software modules relating to managing access through the access control point, such as a gate arm controller module or a license plate reader module. Databases dedicated to access control points may store portions of an enrolled entrant database relating to the access control point, such as records of authorized entrants who have previously entered through the access control point or who are expected to enter through the access control point.

A next higher-level may comprise site servers and databases dedicated to one or more facility sites. Servers dedicated to a facility site may execute one or more software modules relating to managing access to the facility site, such as replicating database records in and among access control points. Databases dedicated to facility sites may store portions of an enrolled entrant database relating to the facility site, such as records of authorized entrants who have previously entered the facility site or who are expected to enter the facility site.

A highest-level may comprise an enterprise server and an enterprise database. Enterprise servers may execute one or more software modules relating to managing access to each of the facility sites and managing the flow of information to each of the databases. In some cases, enterprise servers may search external databases (e.g., National Crime Information Center database administered by the FBI and Department of Justice) for records relating to approaching vehicles and/or individual seeking access to a facility site. Enterprise databases may store an enrolled entrant database comprising records of authorized entrants who are authorized to enter facility sites.

Embodiments of the access control system may facilitate data replication and synchronization among databases. An access control point may have a dedicated database, and the one or more access control point databases may be backed up or replicated to a site database. The site server may control the information for the facility site, independently from other facility sites. An enterprise database having data replicated from one or more facilities sites may receive a replication from the site database on regular schedule or on-demand. Each of the databases may be synchronized by replicating data both up and down hierarchical levels.

FIG. 1 shows an exemplary system embodiment of an automated access control and entry system. The exemplary embodiment of the access control system 100 of FIG. 1 comprises a facility site 107, a network 111, an enterprise server 112, an enterprise database 113, and a crime database 114. A facility site 107 comprising an access control point ("ACP") 101, a site server 109 and a site database 110. An ACP 101 comprising an ACP server 102, an iris scanner 103, a camera 104, a token reader 105, a gate arm 106, and an ACP database 108.

An ACP 101 may be a point of entry or egression into a facility site 107, such as a building, a military post, a school campus, or other building or campus requiring controlled access. An ACP 101 may be a doorway, corridor, a lane for vehicles, or a lane for pedestrians that is monitored for authorized access. A facility site 107 may have one or more ACPs 101. In some embodiments, an ACP 101 may be associated with a nearby ACP server 102 that may monitor access records and perform various database searches to identify individuals seeking access to the facility site 107 through the ACP 101. Embodiments of an ACP 101 may further comprise and/or be associated with an iris scanner 103, a camera 104, a token reader 105, and a gate arm 106. In some embodiments, an ACP 101 may have a guardhouse (not shown) or other nearby shelter in which one or more of the components of the ACP 101 may be housed.

Some embodiments of an ACP 101 utilize a gate arm 106 that may control or prevent access to the facility site 107 before authorization is granted to an individual seeking access. It should be appreciated that embodiments of a gate arm 106 may be any physical means of blocking an ACP 101 that may be controlled by an ACP server 102. In embodiments of an ACP 101 having a gate arm 106, an ACP server 102 at the ACP 101 may execute a gate arm controller module to automatically actuate the gate arm 106 based on the status of authorization for an individual seeking access.

Embodiments of an ACP 101 may comprise an iris scanner 103. An iris scanner 103 may be any device capable of capturing an iris (of an eyeball) for an individual seeking access and then transmitting the captured iris scan to an ACP server 102. In some embodiments, the iris scanner 103 may capture the iris, and perform the scan and identification, of the individual. In some embodiments, the iris scanner 103 may capture an image or scan of the iris and then transmit the image to the ACP server 102 for identification.

Embodiments of an ACP 101 may comprise one or more iris scanners 103 at one ACP 101. In such embodiments of the ACP 101, an iris scanner 103 may be positioned at different heights or may be placed to provide redundancy. In some embodiments, an iris scanner 103 may integrated with a panel associated with a token reader 105, an intercom, or a keypad. In some embodiments of an ACP 101, an iris scanner 103 may be positioned along an entry lane and attached to a post, an overhang, or attached to a nearby structure (e.g., guardhouse).

Embodiments of an ACP 101 may comprise a camera 104 for capturing individuals and/or vehicles approaching the ACP 101. The camera 104 may be any device capable of recording video or capturing still images of vehicles. The camera 104 may be communicatively connected to an ACP server 102 and may transmit images and/or video to the connected ACP server 102. Embodiments of a camera 104 may capture a license plate of the vehicle approaching the ACP 101 and then transmit the license plate to the ACP server 102 for identification and/or assessment of the approaching vehicle.

Embodiments of an ACP 101 may employ one or more cameras 104 at a single ACP 101. In such embodiments of the ACP 101, a camera 104 may be positioned at different heights or may be placed so as to provide redundancy. In some embodiments of an ACP 101, a camera 104 may be placed so as to capture an image of a license plate of an approaching vehicle before an iris scanner 103 may be scan an iris of a passenger of the vehicle. The image may be transmitted to an ACP server 102 for identification of the vehicle. The iris scanner 103 may then be positioned at a location within the ACP 101 where scanning a passenger's iris occurs after or while an assessment of the vehicle occurs. In some embodiments of an ACP 101, a camera 104 may be positioned along an entry lane and attached to a post, an overhang, or attached to a nearby structure (e.g., guardhouse).

Embodiments of an ACP 101 may comprise a token reader 105 for determining authorization based upon a token (e.g., badge) issued to an individual who is enrolled into an enrolled entrant database hosted on one of the databases 108, 110, 113. A token reader 105 may be a panel or other device that accepts input from a token of an individual seeking access to the facility site 107. The token reader 105 may send the information read from the token to an ACP server 102 for identification and verification of authorized access. A token reader 105 may also include a keypad or other means of testing an individual seeking access for input required for authorization (e.g., fingerprint scanner, intercom).

An ACP server 102 may be any computing device capable of executing software modules required for the particular embodiment of the associated ACP 101 and the various components of embodiments of an access control system 100. It is to be appreciated that an ACP server 102 may be one or more computing devices. That is, a plurality of computing devices may act in concert as the ACP server 102. It is to be appreciated that one ACP server 102 may be associated with one or more ACPs 101 at a facility site 107. It is to be appreciated that an ACP server 102 may be the same device as a site server 109.

In some embodiments, the ACP server 102 may execute a gate arm controller module that may control actuation of a gate arm 106 for the ACP 101. In some embodiments, the ACP server 102 may comprise a license plate reader module capable of identifying various characters on a license plate and, in some cases, identifying a jurisdiction of a license plate. The license plate reader module may use images received from a camera 104. Some embodiments of an ACP server 102 may comprise a iris identification module capable of identifying characteristics of an iris from a scan received from an iris scanner 103.

Embodiments of an ACP 101 server may be communicatively coupled with one or more computing devices at the ACP 101, at a facility site 107, or in the access control system 100. In some embodiments, the ACP server 102 may be connected to an ACP database 108. In some embodiments, the ACP server 102 may host the ACP database 108 on the same device.

An ACP database 108 may be non-transitory machine-readable storage medium storing records and information relating to an ACP 101. The ACP database 108 may store a history individuals seeking access to through the ACP 101, a history of vehicles approaching the ACP 101, a history of authorized entries into the facility site 107 through the ACP 101, among other information regarding access at the ACP 101.

Embodiments of an ACP database 108 may store all, or a portion, of an enrolled entrant database. In some embodiments of the access control system 100, an enterprise database 113 may store an enrolled entrant database for individuals authorized to access one or more facility sites 107 associated with the access control system 100. A facility site 107 may have a site database 110 storing a portion of the enrolled entrant database replicated from the enterprise database 113 for a subset of individuals who have previously accessed the facility site 107, who are currently authorized to access the facility site 107, and/or who may be expected to seek access to the facility site 107 in the future. Similarly, the ACP database 108 may store a portion of the enrolled entrant database replicated from the site database 110 for a subset of individuals who have previously entered through the ACP 101, are currently authorized to enter through the ACP 101 or may be expected to seek access through the ACP 101.

It is to appreciated that an ACP database 108 may be associated with one or more ACP 101 locations of a facility site 107. It is to appreciated that the ACP database 108 may be more than one device operating in a distributed computing environment. In some embodiments, the ACP database 108 may be the same device as the site database 110.

As mentioned previously, some embodiments of the ACP server 102 may receive an image of a license plate from a camera 104. In some embodiments, a license plate reader module may identify the characters on the license plate. The ACP server 102 may then search one or more databases 108, 110, 113, 114 for records regarding the license plate. In some embodiments, the ACP server 102 may search an ACP database 108 that is proximately located and is associated with the same ACP 101 as the ACP server 102, thus being efficient; particularly when the ACP database 108 only stores information relating only the ACP 101. The ACP database 108 may store a record of the license plate in association with one or more authorized entrants. In some embodiments of the ACP database 108, records may store a authorized entrants in association with recent license plates identified as entering through the ACP 101.

Some embodiments of the ACP server 102 may receive a scan of an iris of an individual seeking access through the ACP 101, such as a passenger of a vehicle or a pedestrian. In some embodiments, the ACP server 102 may comprise a biometrics module capable of resolving characteristics of biometric measurements (e.g., iris scan, fingerprint, blood same, voice print) and resolving the identity of an individual in an enrolled entrant database. In some embodiments, the ACP server 102 may search one or more databases 108, 110, 113, 114 for a match to an identify of the individual associated with the iris scan from the iris scanner 103. In some embodiments of the access control system 100, an enrolled entrant may be associated with their uniquely identifying iris, which is stored in the enterprise database 113 and may be replicated to the site database 110 and/or the ACP database 108.

In some embodiments, an ACP server 102 may search a site database 110 that is a distinct database from the ACP database 108. In such embodiments, the ACP server 102 may search the site database 110 for a record of an iris scan of individual seeking access and/or a license plate of an approaching vehicle. In some cases, the ACP server 102 may fail to find the record of the iris and/or license plate in the ACP database 108. In such cases, the ACP server 102 may search the high-level site database 110. In some embodiments, the site server 109 may replicate the retrieved record to the ACP database 108 to quickly reference in the future.

A site server 109 may be any computing device capable of executing software modules required for the particular embodiment of the associated facility site 107 and the various components of embodiments of the embodiment of the access control system 100. It is to be appreciated that a site server 109 may be associated with one or more facility sites 107. It is to be appreciated that a site server 109 may be one computing device or a plurality of devices working together in concert in a distributed computing environment. It is to appreciated that the site server 109 may be the same device as an ACP server 102 and/or an enterprise server 112. It also to be appreciated that the site server 109 may host the site database 110 or be distinct computing device from the site database 110.

Embodiments of a site server 109 may govern information records regarding access to the facility site 107 and the ACPs 101. In some embodiments, the site server 109 may replicate data records in and among the various ACP databases 108 at the facility site 107. In some embodiments, the site server 109 may replicate data upwards over a network 111 to an enterprise server 112 to be stored on the enterprise database 113. In some embodiments, the site server 109 may execute a query of a site database 110 on behalf of the ACP server 102. In some embodiments, the site server 109 may execute a query on behalf of the ACP server 102 over the network 111. The site server 109 may query the enterprise database 113 and/or an external data source, such as a national crime database 114.

Some embodiments of the access control system 100 may comprise a network 111 comprising devices and software capable of facilitating networked communication between each of the devices and modules described herein. The network 111 may facilitate communication in and among devices at an ACP 101, a facility site 107, and in the access control system 100. The network 111 may facilitate communication with external data sources, such as news outlets, and a national crime database 114, among others. The network 111 may be secured and private or the network 111 may be public, or the network 111 may be a hybrid of private and public elements and devices.

Some embodiments of the access control system 100 may comprise an enterprise server 112 that may govern information records regarding access to one or more facility sites 107 in the access control system 100. In some embodiments, the enterprise server 112 may replicate data records over the network 111 to site databases 110 associated with facility sites 107. In some embodiments, the enterprise server 112 may store data replicated from site databases 110 into an enterprise database 113. In some embodiments, the enterprise server 112 may execute a query of an enterprise database 113 on behalf of an ACP server 102 and/or site server 109. In some embodiments, the enterprise server 112 may execute a query on behalf of the ACP server and/or site server 109 of an external data source, such as a national crime database 114.

Some embodiments of an access control system 100 may comprise or query an external data source. In some embodiments, the external data source may be a crime database 114. In some embodiments, the crime database 114 may be associated with a local jurisdiction or authority. In some embodiments, the crime database 114 may be associated with a national authority. In some embodiments, the crime database 114 may store data relating to license plates (e.g., stolen status, associated vehicle) and vehicles (make, model, association with crime). In some embodiments, the crime database 114 may store data relating to individuals, such as biographical information, appearance features (e.g., height, weight, gender), biometric data (e.g., fingerprints), and criminal history, among others. In some embodiments, the crime database 114 may store a watch list for suspects within the purview of the authority associated with the crime database 114. i.e., a local watch list is stored in a crime database 114 of a local authority and a national watch list is stored in a crime database 114 of a national authority. The watch list may be associated with people and/or vehicles.

In some embodiments of a site server 109, the site server 109 may query the crime database 114 of the local authority and retrieve a local watch list. The local watch list may be replicated to the ACP databases 108 associated with the facility site 107. In some embodiments, an enterprise server 112 may query the crime database 114 of a national authority and retrieve a national watch list. The national watch list may replicated to the site databases 110 at each facility site 107 in the access control system 100.

Figure 2:
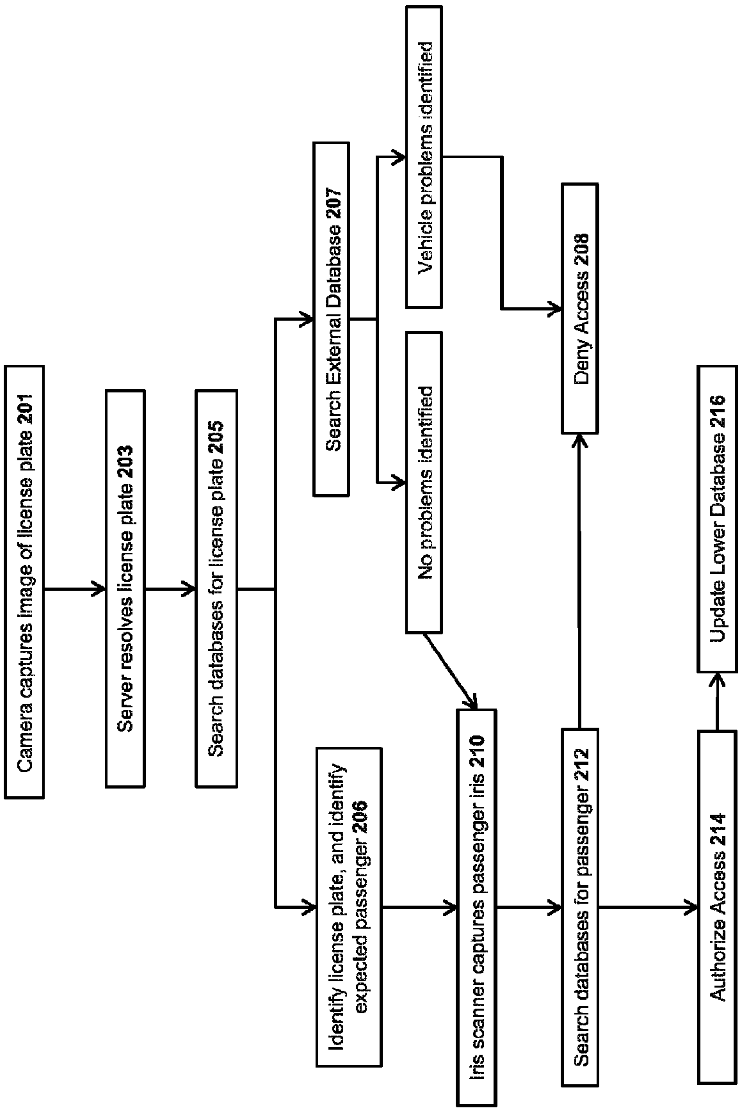
FIG. 2 shows steps of a method for controlling access to a facility site and managing data for making automated entry determinations according to an exemplary embodiment.

FIG. 2 shows a method embodiment of an access control system determining authorization of vehicle approaching an access control point of a facility site. The method embodiment shown in FIG. 2 may comprise steps 201, 203, 205, 206, 207, 208, 209, 210, 211, 212, 213, 214, 216, but it is to be appreciated that method embodiments may include additional steps, fewer steps, and/or different steps.

In a first step 201, a camera may capture an image showing a license plate attached to a vehicle approaching an access control point at a facility site. The camera may transmit the image to a server associated with the access control point. In some embodiments, the server may be an access control point server that is designated to manage aspects of the access control point. In some embodiments, the server may be a site server that is designated to manage aspects of one or more access control points at the facility site. That is, the facility site may have access control point servers dedicated to one or more access control points, which may be hierarchical lower than a site server. Alternatively, the facility site may forego dedicated access control point servers and instead implement site servers that manage each of the access control points of the facility.

In a next step 203, a server may resolve the license plate characters after receiving the image showing the license plate from the camera. In some embodiments, the server may execute a license plate reader software module that may identify the characters on the license plate. The license plate reader may also identify a jurisdiction of the license plate.

In a next step 205, a server at a first hierarchical level associated with the access control point may search one or more databases for records related to the identified license plate. In some embodiments, the databases may store all or a portion of an enrolled entrant database identifying enrolled entrants authorized to enter facility sites. In some embodiments, a site database and/or an access control point may store all or a portion of the enrolled entrant database.

In some embodiments, the databases store records of license plates previously entering access control points and/or facility sites. In some embodiments, the databases may store records of license plates being authorized to enter facility sites and/or access control points. In some embodiments, the databases may store records of license plates being associated with prior passengers who were authorized to enter and/or turned away without access.

In some embodiments, the server may be an access control point server that is nearby the access control point. The access control point server may search an access control point database for records of the license plate previously entering the facility site at the access control point. In some embodiments, when a record of the license plate is not found in the access control point database, the access control point server may search a site database for records of the license plate previously entering the facility site. In some embodiments, when a record of the license plate is not found in the site database, an access control point server may search an enterprise database to identify the license plate. It is to be appreciated that, additionally or alternatively, searches of the various databases may be performed by one or more servers, such as by a site server and/or an enterprise server.

In a next step 206, a server may identify the license plate in an access control point database and then search records of passengers related to the identified license plate. In some embodiments, a database may store license plates in relation to individuals authorized to enter the facility site in an enrolled entrant database. In some embodiments, a database may store records of recent license plates previously authorized to enter a facility site in relation to passengers who were authorized to enter.

In the exemplary embodiment, an access control point server may identify the license plate in an access control point database and identify a passenger expected to be in the vehicle having the identified license plate. The computer may load the license plate and information about identified individual(s) into a quickly accessible memory (e.g., cache memory, local memory) before the vehicle reaches an iris scanner. The quickly accessible memory can be a storage location having a computer readable medium storing the individual information associated with the license plate, where the iris scan can be more quickly matched than the database of iris scan records.

In a next step 207, in addition or as an alternative to step 206, a server in the access control system may search an external database having records related to license plates to identify information relating to the license plate and vehicle. In some embodiments, when a server does not identify the license plate in a database, the server may search an external source, such as a local law enforcement database, a national law enforcement database, or other data sources that may contain information relating to vehicle license plates.

In some embodiments, a local database may store a local watch list comprising license plates suspected to be related to crime. In some embodiments, a national database may store a national watch list comprising license plates suspected to be related to crime. In some embodiments, a watch list may comprise individuals related to crimes. In some embodiments, a site server may update site databases to include local watch lists. In some embodiments, an enterprise server may update databases in the access control system to include national watch lists.

In the exemplary embodiment, a server may search a crime database (e.g., local police blotter, NCIC) for information regarding the license plate. Servers may identify whether there is a problem with approaching vehicles (e.g., allegedly linked to a crime, reported stolen, license plate is not accurately matched to the vehicle, reported on a watch list) based on a search of the crime database using the identified license plate. When problems are identified with regards to the license plates and/or approaching vehicle, the system may proceed to a next step 208. In the next step 208, a server identifying a problem with the license plates after searching an external database may report to the lowest level database to deny access to the approaching vehicle. In some embodiments, one or more databases in the system may be updated based upon the results of searching external crime databases. In some embodiments, one or more databases associated may be updated to include information regarding the denied vehicle, this may include the database associated with the access control point.

In some embodiments, deny access to an approaching vehicle may include instructing an access control point server or a site server to obstruct an entry lane of the access control point. That is, embodiments of servers associated with an access control point may execute gate arm controller module that may actuate lane obstructions. The obstruction may be a gate arm, a bollard, a fence, a barrier, and any other movable obstruction capable of being employed or removed in response to instructions of the gate arm controller module.

When no problems are identified with the license plates and/or approaching vehicle, the system may proceed to identifying passengers in a next step 210.

In a next step 210, after a vehicle is identified in a database of the system, or after an unrecognized vehicle has no problems listed in a crime database, an iris scanner captures scans of irises passengers of the approaching vehicle.

Embodiments of databases may store various data identifying enrolled entrants authorized to access facility sites associated with the access control system. Non-liming examples of identifying data may include passwords, biometric measurements, and tokens issued to authorized entrants. It is to be appreciated that this list is not exhaustive and that any combination of one or more of these means for identifying enrolled entrants may be utilized within the scope of the invention.

In the exemplary embodiment of FIG. 2, the access control point may utilize iris scans as one means for determining whether an individual may be authorized to access the facility site. An iris scanner may transmit the scan of a passenger to the server of the access control point for processing. In some embodiments, the server at the access control point may identify an expected passenger related to the license plates and store data records for the expected passenger in a quickly accessible memory.

In some embodiments, individuals seeking access to the facility site may be required to present a token (e.g., badge) to a token reader. In some embodiments, individuals seeking access to the facility site may be required to enter a knowledge key (e.g., password), and/or some further biometric (e.g., finger print, voice print).

In a next step 212, servers may search databases for passengers uniquely identified by the iris scan. As mentioned previously, databases may store individuals authorized to enter the facility site. These databases may store uniquely identifying iris scans, among other forms of identifying authorized entrants. In some embodiments, servers may begin searching databases at a lowest hierarchical level of databases, such as a database associated with the access control point that stores records of individuals who have previously entered through the access control point and/or record of individuals who are authorized to enter.

In some embodiments, servers may proceed to search a site database at a higher hierarchal level of databases for records of authorized entrants when an individual identified by the iris scan is not found in lower-level databases. Embodiments of the site database may store records of individuals who have accessed the facility site and/or records of individuals authorized to enter the facility site. Embodiments of the access control system may comprise a logical architecture comprising any number of hierarchical levels. Servers and databases in each successively higher level may store data, manage data, and execute software modules that each have a successively broader scope until reaching the highest hierarchical level comprising an enterprise database and/or an enterprise server. Servers may proceed to search databases at each level until successfully identifying an authorized entrant who is associated with the iris scanned.

In some embodiments, such as the exemplary embodiment of FIG. 2, a server of an access control point may retrieve an iris scan record for a passenger who is expected to be in an approaching vehicle after the license plates of the vehicle are searched. As mentioned above, searching license plates of approaching vehicles may yield one or more expected passengers. The records storing the iris scans of these expected passengers may be retrieved from the most accessible database, or other quickly accessible memory, to minimize the search time required for servers to search and locate iris scans for authorized entrants.

In some cases, an individual seeking access to the facility site may not be found in the databases of the access control system. In such cases, the system may proceed to a step 208. In a step 208, the system may deny access to individuals seeking access to a facility site. In some embodiments, the system may update one or more databases to identify the individual as having been denied access.

If an individual seeking access is found in one of the databases storing enrolled entrants who are authorized, the system may proceed to a next step 214. In next step 214, the system may authorize access to individuals, such as passengers of an approaching vehicle, who are trying to access a facility site through an access control point.

In some embodiments, if a server was required to identify an enrolled entrant in a higher-level database, lower-level databases may be updated to include a record for the enrolled entrant. In some embodiments, a database associated with the access control point may be updated to include a record of the vehicle associated with the enrolled entrant authorized to enter the facility site at the access control point.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for controlling access to a facility at an access control point, the method comprising:

receiving, by a computer of an access control system, an image from a camera of a license plate associated with a vehicle approaching the access control point;

searching, by the computer, for a record of the vehicle according to the license plate in a first data base of one or more databases logically residing in a hierarchical architecture storing one or more records of vehicles approaching the access control point, and wherein each record of the vehicle comprises the license plate, an indication of an identity for one or more individuals previously identified in the vehicle from a prior entry, a unique iris scan of the one or more previously identified individuals from a prior entry, and an indication of whether authorization was granted;

searching, by the computer, when the record of the license plate is not found in the first database, remaining databases of the one or more databases that are at a higher-hierarchical level than the first database to retrieve one or more deny access records of the license plate indicating an identified problem for granting access to the vehicle, storing, by the computer, the record of the vehicle into a cache memory accessible to the computer before the vehicle reaches an iris scanner;

receiving, by the computer, a scan from the iris scanner of an iris of each individual currently in the vehicle;

comparing, by the computer, the scan of the iris of each individual currently in the vehicle against the unique iris scan for previous one or more individuals in the record of the vehicle;

denying, by the computer, access for the vehicle responsive to determining that the one or more retrieved deny access records indicate problems have been identified; and authorizing, by the computer, access for the vehicle responsive to determining that the individuals currently in the vehicle matches the previous one or more individuals in the vehicle identified from the prior entry and upon determining that the record indicates that authorization was previously granted.

2. The method according to claim 1, furtherer comprising, when the individual currently in the vehicle does not the previous individual in the record in the cache memory:

identifying by the computer, a record in the first database of an individual authorized to enter the access control point comprising a unique iris scan matching the iris scan of the individual currently in the vehicle; and authorizing, by the computer, access for the vehicle responsive to determining that the current individual is authorized to enter based upon the match of the iris scan of the current individual with the unique iris scan of the authorized individual.

3. The method according to claim 2, further comprising identifying, by the computer, the record in the second database of the one or more databases for an individual authorized to enter the access control point comprising the unique iris scan matching the iris scan of the individual currently in the vehicle.

4. The method according to claim 1, further comprising searching, by the computer, a second database for the record of the vehicle according to the license plate.

5. The method according to claim 1, further comprising recognizing, by the computer, a jurisdiction and a set of characters for the license plate.

6. The method according to claim 5, further comprising determining, by the computer, whether the license plate is associated with a record in a crime database.

7. The method according to claim 6, further comprising updating, by the computer, a local watch list in a local database when the license plate is associated with a watch list in the crime database.

8. The method according to claim 1, further comprising associating, by the computer, the individual currently in the vehicle with the vehicle in a new record of one or more databases upon granting authorization for entry.

9. The method according to claim 1, further comprising replicating, by the computer, the first database associated with the access control point to the second database of the one or more databases associated with the facility site, wherein the second database is at a higher-hierarchical level of the first database.

10. The method according to claim 1, further comprising storing, by the computer, a new record for a new authorized individual into the one or more databases.

11. An access control system for controlling access at a facility site, the system comprising:

a camera capturing an image of a license plate of a vehicle approaching an access control point (ACP) of a facility site and transmitting the image of the license plate to an ACP server associated with the ACP;

an iris scanner capturing a scan of one or more individuals in the vehicle approaching the access control point and transmitting the scan to the ACP server;

a cache memory storing a record from the ACP server associated with the license plate to be matched to the one or more individuals based on the scan;

a site database of one more databases logically residing in a hierarchical architecture storing records of one or more enrolled entrants authorized to enter the facility site and associated with a license plate, wherein each enrolled entrant is uniquely identified by a scan of each individual's iris; and the ACP server searching the site database to retrieve a matching record associated with the license plate, wherein when the retrieved record of the license plate is not found in the site database, the ACP server searches the remaining databases of the one more databases that are at a higher-hierarchical level of the site databases for records matching the license plate for one or more deny access records of the license plate indicating an identified problem for granting access to the vehicle, and wherein the ACP server automatically authorizes entry to the approaching vehicle responsive to matching the scan of the iris of each individual in the vehicle with the unique iris of an enrolled entrant and matching the license plate of the vehicle with the license plate associated with the enrolled entrant; and where the ACP server denies access for the vehicle responsive to determining that the one or more retrieved deny access records indicate problems have been identified.

12. The system according to claim 11, further comprising an enterprise database storing an enrolled entrant authorized to enter the facility not in the site database.

13. The system according to claim 11, wherein the ACP server identifies a set of one or more characters on the license plate of the approaching vehicle.

14. The system according to claim 11, wherein the ACP server queries a crime database for an association with a crime using the license plate of the approaching vehicle.

15. The system according to claim 14, further comprising a local watch list database storing one or more license plates associated with one or more crimes in the crime database, wherein each license plate in the located watch list database is associated with a previous vehicle to approach the facility.

16. The system according to claim 11, the ACP server further comprising a gate arm controller actuating a gate arm obstructing a lane at the access control point, wherein the gate arm controller removes the gate arm responsive to authorizing entry to the approaching vehicle.

* * * * *